(12) United States Patent
Assem Aly Salama et al.

(10) Patent No.: US 9,711,151 B2
(45) Date of Patent: *Jul. 18, 2017

(54) QUALITY OF EXPERIENCE FOR COMMUNICATION SESSIONS

(71) Applicant: International Business Machines Corporation, Armonk, NY (US)

(72) Inventors: Hitham Ahmed Assem Aly Salama, Blanchardstown (IE); Jonathan Dunne, Dungarvan (IE); James P. Galvin, Jr., Georgetown, KY (US); Liam Harpur, Skerries (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,964

(22) Filed: Feb. 23, 2016

(65) Prior Publication Data

US 2016/0247517 A1 Aug. 25, 2016

Related U.S. Application Data

(63) Continuation of application No. 14/630,787, filed on Feb. 25, 2015.

(51) Int. Cl.
*G06F 17/20* (2006.01)
*G06F 17/27* (2006.01)
(Continued)

(52) U.S. Cl.
CPC ........ *G10L 19/0018* (2013.01); *G10L 15/005* (2013.01); *G10L 15/30* (2013.01);
(Continued)

(58) Field of Classification Search
None
See application file for complete search history.

(56) References Cited

U.S. PATENT DOCUMENTS 6,256,606 B1 7/2001 Thyssen et al.
6,336,090 B1 1/2002 Chou et al.
(Continued)

FOREIGN PATENT DOCUMENTS

CN 101442434 A 5/2009
CN 102044250 A 5/2011
WO 2011059433 A1 5/2011

OTHER PUBLICATIONS

Samsami et al., "Evaluation of Media Server in SIP-Based Voice Conferencing," International Journal of Computer Theory and Engineering., vol. 5, No. 4, Aug. 2013, pp. 745-749.
(Continued)

*Primary Examiner* — Satwant Singh
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for managing quality of experience for communication sessions. In an implementation, a method may include determining a language spoken on a communication session. The method may also include selecting a codec for the communication session based upon, at least in part, the language spoken on the communication session. The method may further include transacting the communication session using the selected codec for the communication session.

8 Claims, 10 Drawing Sheets

(51) Int. Cl.
*G06F 17/21* (2006.01)
*G10L 19/00* (2013.01)
*H04M 3/22* (2006.01)
*G10L 15/00* (2013.01)
*G10L 15/30* (2013.01)
*G10L 19/22* (2013.01)
*H04L 29/06* (2006.01)
*H04M 7/00* (2006.01)

(52) U.S. Cl.
CPC ............ *G10L 19/22* (2013.01); *H04L 65/403* (2013.01); *H04L 65/605* (2013.01); *H04L 65/80* (2013.01); *H04M 3/2227* (2013.01); *H04M 7/0072* (2013.01); *H04M 2242/12* (2013.01); *H04M 2250/58* (2013.01)

(56) References Cited

U.S. PATENT DOCUMENTS

| | | | |
|---|---|---|---|
| 7,111,049 B1* | 9/2006 | Granger | G10L 19/0019 370/241 |
| 7,369,543 B2* | 5/2008 | Granger | G10L 19/0019 370/260 |
| 7,376,710 B1* | 5/2008 | Cromwell | H04M 3/493 379/1.02 |
| 7,656,866 B2 | 2/2010 | Banner et al. | |
| 7,899,865 B2 | 3/2011 | Banner et al. | |
| 8,089,955 B2* | 1/2012 | Granger | G10L 19/0019 370/260 |
| 8,284,922 B2 | 10/2012 | Singh | |
| 8,311,824 B2 | 11/2012 | Lubowich et al. | |
| 8,375,025 B1 | 2/2013 | Datar et al. | |
| 8,396,973 B2* | 3/2013 | Wang | H04L 29/06027 709/204 |
| 8,635,061 B2 | 1/2014 | Li et al. | |
| 8,737,400 B2* | 5/2014 | Ross | H04N 21/23406 370/392 |
| 8,768,984 B2* | 7/2014 | Priddle | H04N 5/91 348/180 |
| 8,838,437 B1 | 9/2014 | Buryak et al. | |
| 8,842,580 B2* | 9/2014 | Granger | G10L 19/0019 370/259 |
| 9,208,231 B1* | 12/2015 | Upstill | G06F 17/30864 |
| 2004/0032860 A1 | 2/2004 | Mundra et al. | |
| 2006/0288387 A1* | 12/2006 | Asai | H04H 20/08 725/78 |
| 2007/0104185 A1 | 5/2007 | Walter et al. | |
| 2008/0162150 A1 | 7/2008 | Ramaswamy | |
| 2014/0303968 A1 | 10/2014 | Ward et al. | |
| 2016/0105543 A1* | 4/2016 | Ponting | H04M 3/2227 379/1.03 |
| 2016/0247511 A1* | 8/2016 | Assem Aly Salama | G10L 19/0018 |
| 2016/0247517 A1 | 8/2016 | Assem Aly Salama et al. | |

OTHER PUBLICATIONS

Xiao-gang et al., "Design and Implementaion of VOIP system Based on Speex Codec," Application Research of Computers, vol. 24, No. 12, Dec. 2007, pp. 320-323.

De Cristofaro et al., "QOS Evaluation of a Voice Over IP Network with Video: A Case Study," School of Information Technology, Carelton University, Ottawa, ON, Canada IEEE, 2009, pp. 288-292.

Disclosed Anonymously, "System and Method for Mitigating Audio Quality Issues in a VoIP Call," ip.com, ip.com No. 000211533, Published Oct. 10, 2011, pp. Cover-3.

IBM, "A Method and Apparatus for Cost Reduction of Telephony Conference Using VoIP," ip.com, ip.com No. 000014590, Published Jun. 19, 2003, pp. Cover-5.

Pendleton et al., "Session Initiation Protocol Event Package for Voice Quality Reporting (RFC6035)," ip.com, ip.com No. 000201993, Published Dec. 1, 2010, pp. Cover-83.

IBM, "Method and System for Cost Effective and High Performance Mobile Call Routing," ip.com, ip.com No. 000177837, Published Jan. 6, 2009, pp. Cover-12.

Ren et al., "Assessment of Effects of Different Language in VOIP," IEEE, Published 2008, pp. 1624-1628.

"Codec Comparison," https://www.broadcom.com/Support/broadvoice/codec_comparison.php, Downloaded Dec. 2, 2014, pp. 1-4.

IBM Appendix P, Applications to be Treated as Related, Filed Feb. 23, 2016, pp. 1-2.

IBM Correction to Appendix P, Applications to be Treated as Related, Filed Mar. 1, 2016, pp. 1-2.

International Search Report and Notification received in International Application No. PCT/IB2016/050934, Dated Jun. 6, 2016, pp. 12.

* cited by examiner

| Conference A | |
|---|---|
| Spoken Language Recognized | English |
| Packet loss | 2% |
| Delay | 100 ms |
| Jitter | 5 ms |
| Current MOs | 3.6 |

FIG. 5

| Conference B | |
|---|---|
| Spoken Language Recognized | Italian |
| Packet loss | 5% |
| Delay | 150 ms |
| Jitter | 10 ms |
| Current MOS | 3.2 |

FIG. 8

QUALITY OF EXPERIENCE FOR COMMUNICATION SESSIONS

RELATED APPLICATIONS

The subject application is a continuation application of U.S. patent application with Ser. No. 14/630,787, filed on Feb. 25, 2015, the entire content of which is herein incorporated by reference.

TECHNICAL FIELD

The present disclosure generally relates to systems and method for electronic communications, and more particularly relates to managing quality of experience for electronic communication sessions.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

Voice over Internet Protocol (VoIP) applications have gained wide acceptance by general Internet users and are increasingly important in the enterprise communications sector. However, achieving voice quality levels for VoIP remains a significant challenge, as IP networks typically do not guarantee non-delay, packet loss, jitter and bandwidth levels. In a VoIP application, voice is digitized and packetized at the sender before its transmission over the IP network to the receiver. At the receiver the packets are decoded and played out to the listener. The process of converting an analogue voice signal to digital is done by an audio "codec".

Codecs vary in bandwidth required, latency, sample period, frame size and the maximum achieved end user perceived quality, thus different codecs are better suited to different network conditions. Consequently, codec selection techniques have been introduced in VoIP applications in order to make use of the different performance of codecs under different network conditions. However, various considerations in addition to network conditions continue to present challenges to providing acceptable levels of quality of experience for VoIP users.

SUMMARY OF DISCLOSURE

According to an implementation, a computer-implemented method may include determining, by a processor, a language spoken on a communication session. The method may also include selecting, by the processor, a codec for the communication session based upon, at least in part, the language spoken on the communication session. The method may further include transacting, by the processor, the communication session using the selected codec for the communication session.

One or more of the following features may be included. Determining the language spoken on the communication session may include processing at least a portion of a conversion using voice recognition. Determining the language spoken on the communication session may include identifying one or more participant characteristic. Determining the language spoken on the communication session may include determining a plurality of languages spoken on the communication session and associating a weighting factor with each of the plurality of languages.

The method may further include determining one or more network characteristics associated with the communication session. Selecting the codec for the communication session may be based upon, at least in part, the one or more network characteristics. Selecting the codec for the communication session may include selecting the codec for the communication during set-up of the communication session. Selecting the codec for the communication session may be in response to determining a change in the language spoken on the communication session. Selecting the codec for the communication session may be in response to determining a change in one or more network characteristics associated with the communication session.

According to another implementation, a computer program product may include a non-transitory computer readable storage medium having a plurality of instructions stored on it. When executed by a processor, the instructions may cause the processor to perform operations including determining a language spoken on a communication session. Instructions may also be included for selecting a codec for the communication session based upon, at least in part, the language spoken on the communication session. Instructions may further be included for transacting the communication session using the selected codec for the communication session.

One or more of the following features may be included. The instructions for determining the language spoken on the communication session may include instructions for processing at least a portion of a conversion using voice recognition. The instructions for determining the language spoken on the communication session may include instructions fore identifying one or more participant characteristic. The instructions for determining the language spoken on the communication session include instructions for determining a plurality of languages spoken on the communication session and associating a weighting factor with each of the plurality of languages.

Instructions may also be included for determining one or more network characteristics associated with the communication session. Selecting the codec for the communication session may be based upon, at least in part, the one or more network characteristics. The instructions for selecting the codec for the communication session may include instructions for selecting the codec for the communication during set-up of the communication session. Selecting the codec for the communication session may be in response to determining a change in the language spoken on the communication session. Selecting the codec for the communication session may be in response to determining a change in one or more network characteristics associated with the communication session.

According to another implementation, a computing system may include a processor and a memory module coupled with the processor. The processor may be configured for determining a language spoken on a communication session. The processor may also be configured for selecting a codec for the communication session based upon, at least in part, the language spoken on the communication session. The processor may further be configured for transacting the communication session using the selected codec for the communication session.

One or more of the following features may be included. Determining the language spoken on the communication session may include processing at least a portion of a conversion using voice recognition. Determining the language spoken on the communication session may include identifying one or more participant characteristic. Determining the language spoken on the communication session may include determining a plurality of languages spoken on the communication session and associating a weighting factor with each of the plurality of languages.

The processor may be further configured for determining one or more network characteristics associated with the communication session. Selecting the codec for the communication session may be based upon, at least in part, the one or more network characteristics. Selecting the codec for the communication session may include selecting the codec for the communication during set-up of the communication session. Selecting the codec for the communication session may be in response to determining a change in the language spoken on the communication session. Selecting the codec for the communication session may be in response to determining a change in one or more network characteristics associated with the communication session.

According to yet another implementation, a computer implemented method may include determining a language spoken on a communication session. The method may also include determining one or more network characteristics associated with the communication session. The method may also include selecting an initial codec for the communication session based upon, at least in part, the language spoken on the communication session and the one or more network characteristics. The method may also include transacting the communication session using the selected initial codec for the communication session. The method may also include determining a changed network characteristic associated with the communication session. The method may also include selecting a changed codec for the communication session based upon, at least in part the language spoken on the communication session and the changed network characteristic. The method may further include transacting, by the processor, the communication session using the changed codec for the communication session.

Consistent with some embodiments of the present disclosure, it has interestingly been shown that the performance of codecs may vary based on the spoken language as well, as well as based on factors such as network conditions. As such, the present disclosure may propose a new method for improving and sustaining the call quality via codec switching based on the network conditions and spoken language. Thus, being able to take into consideration not only network conditions, but also the language being spoken, it may be possible to attain maximum call quality at the end user.

The details of one or more implementations are set forth in the accompanying drawings and the description below. Other features and advantages will become apparent from the description, the drawings, and the claims.

BRIEF DESCRIPTION OF THE DRAWINGS

FIG. 5 diagrammatically depicts an implementation of the quality of experience process of FIG. 1, according to an example embodiment;

FIG. 8 diagrammatically depicts an implementation of the quality of experience process of FIG. 1, according to an example embodiment;

Like reference symbols in the various drawings indicate like elements.

DETAILED DESCRIPTION

Figure 1:
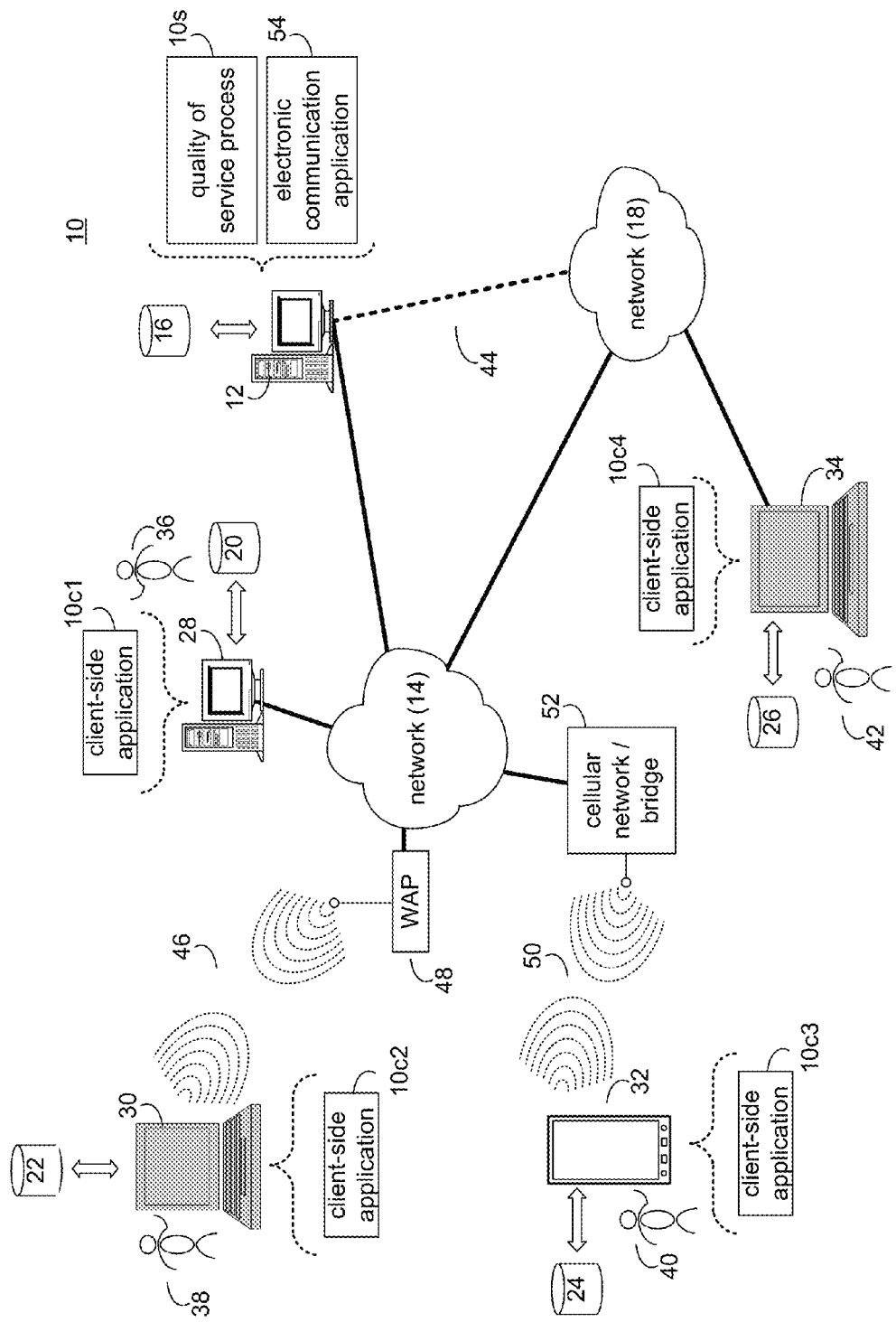
FIG. 1 is a diagrammatic view of a distributed computing network including a computing device that executes a quality of experience process according to an implementation of the present disclosure.

Individuals may often engage in communication sessions, utilizing a data network for conveying the communications. Such communication sessions may include, for example, Voice-over-IP and Video-over-IP communications, in which the communications to and from each party may be conveyed as packetized data over a data network. Various different codecs have been developed for converting analog voice signals into digital data that may be conveyed as packetized data over the data networks. Consistent with an embodiment, the present disclosure has determined that the performance of various codecs may vary based upon, at least in part, the language that is being spoken, and which is being converted into digital data by the codec. That is, different codecs may provide digital representations of spoken analogue voice signals of a given language that, when subsequently decoded and provided as an analogue output signal, may provide different levels of quality of experience, e.g., based upon clarity, distortion, subjective understandability, and the like of the analogue output signal. Similarly, a given codec may provide different levels of performance when utilized in connection with different languages. In an embodiment, the spoken language of communication session may be identified, and a codec may be selected based upon, at least in part, the identified spoken language of the communication session, and the communication session may be transacted using the selected codec. As such, in some embodiments, the present disclosure may provide the advantage of improving the quality of experience for participants in a communication session that may be based upon, at least in part, the language being spoken on the communication session. In some embodiments, the present disclosure may be implemented in a centralized communication distribution architecture, e.g., in which communication streams from the various participants of the communication session may be received by a focus (such as a multipoint control unit), which may receive, decode, and mix the communication streams from the various participants, and may encode and transmit the mixed stream to the various participants of the communication session. In some embodiments, the focus may be able to handle different communication sessions simultaneously using different codecs. In some such embodiments, the focus may select the codec to be utilized for each communication session. The focus may include a centralized focus, and/or one or more of the participants of the communication session may act as the focus for the communication session. In some embodiments, a distributed architecture may be utilized, e.g., in which each participant may transmit a communication stream to each other participant of the communication session, and each participant may mix the received streams from each of the other participants of the communication session. In some such embodiments, the codec may be selected by one or more of the participants.

In an embodiment, the language spoken on the communication session may be determined using voice recognition software. For example, a portion of spoken audio from the communication session may be sampled, and may be processed using voice recognition software to determine the language being spoken on the communication session. In some embodiments, one or more participant characteristics may be identified to determine the language spoken on the communication session. Examples of participant characteristics may include a user identified or selected language, a default language established for one or more applications utilized by a participant, a participant geographic location, or other suitable participant characteristics. In some embodiments, a plurality of languages may be identified as being spoken on the communication session. In some such embodiments, the plurality of languages may each be assigned a weighting factor, e.g., based upon the number of participants determined to be using each language, and/or based upon one or more other factors.

As generally discussed above, in an embodiment a codec may be selected for the communication session based upon, at least in part, an anticipate performance of each available codec (e.g., each codec common to all of the participants). That is, a codec may be selected which may be expected to provide the highest quality of experience for the communication session in consideration of the language being spoken on the communication session. In an embodiment, the present disclosure may recognize that the quality of experience associated with a communication session may be impacted by the network conditions associated with the communication session. Accordingly, in some embodiments, one or more network characteristics associated with the communication session may be determined. Further, the codec may be selected based upon, at least in part, the one or more network conditions. That is, a codec expected to provide a relatively high quality of experience (e.g., as compared to the other available codecs) may be selected. For example, a codec expected to provide a relatively high quality of experience for both the spoken language of the communication session and for the prevailing network conditions may be selected.

In an embodiment, a codec may be selected for use with the communication session during set-up of the communication session—e.g., at the time at which the communication session is initiated. Additionally/alternatively, the codec utilized for a communication session may be adaptively and/or dynamically selected or updated. For example, as discussed above the language spoken on the communication session and the network conditions associated with the communication session may effect the quality of experience provided by a given codec. In an embodiment, a codec, or a new/updated codec, may be selected in response to determining a change in the language being spoken on the communication session and/or a change in one or more network conditions associated with the communication session. For example, if in view of the changed language and/or changed network condition, a different codec than the one currently being utilized may provide a relatively higher quality of experience for the communication session, such a codec may be selected as a new of updated codec. In an embodiment, upon selection of the new or updated codec, the communication session may be transacted using the new or updated codec.

Referring to FIG. 1, there is shown quality of experience process 10. For the following discussion, it is intended to be understood that quality of experience process 10 may be implemented in a variety of ways. For example, quality of experience process 10 may be implemented as a server-side process, a client-side process, or a server-side/client-side process.

For example, quality of experience process 10 may be implemented as a purely server-side process via quality of experience process 10s. Alternatively, quality of experience process 10 may be implemented as a purely client-side process via one or more of client-side application 10c1, client-side application 10c2, client-side application 10c3, and client-side application 10c4. Alternatively still, quality of experience process 10 may be implemented as a server-side/client-side process via server-side quality of experience process 10s in combination with one or more of client-side application 10c1, client-side application 10c2, client-side application 10c3, and client-side application 10c4. In such an example, at least a portion of the functionality of quality of experience process 10 may be performed by quality of experience process 10s and at least a portion of the functionality of quality of experience process 10 may be performed by one or more of client-side application 10c1, 10c2, 10c3, and 10c3.

Accordingly, quality of experience process 10 as used in this disclosure may include any combination of quality of experience process 10s, client-side application 10c1, client-side application 10c2, client-side application 10c3, and client-side application 10c4.

Figure 2:
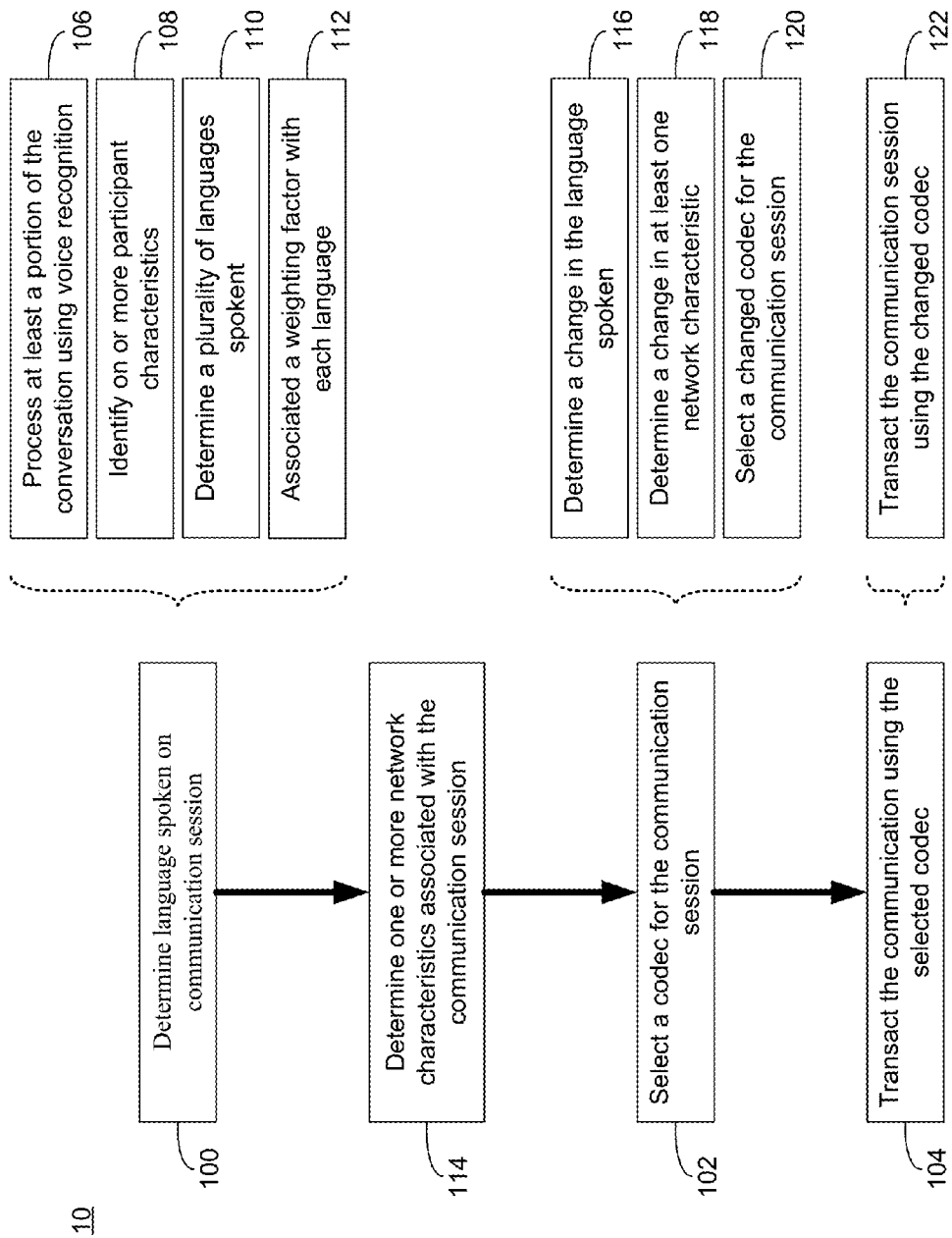
FIG. 2 is a flowchart of the quality of experience process of FIG. 1, according to an implementation of the present disclosure.

Referring also to FIG. 2, and as will be discussed in greater detail below, quality of experience process 10 may determine 100 a language spoken on a communication session. Quality of experience process may also select 102 a codec for the communication session based upon, at least in part, the language spoken on the communication session. Quality of experience process may further transact 104 the communication session using the selected codec for the communication session.

Quality of experience process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of experience process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a voice-over-IP application, a video-over-IP application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access quality of experience process 10 directly through network 14 or through secondary network 18. Further, quality of experience process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, quality of experience process 10 may communicate with, interact with, and/or include a component or module of a communication application (e.g., communication application 54). As is generally known, a communication application (e.g., communication application 54) may generally facilitate audio and/or video communications between individuals as participants in a communication session. For example, communication application 54 may facilitate voice over IP and/or video over IP communications between communication session participants. In some embodiments, a communication session may only include two participants. In some embodiments, a communication session may include more than two participants. In some embodiments, communication application 54 may include, and/or may interact with, for example, an electronic meeting application, a web conferencing application, or a similar application. An example of communication application 54 may include, but is not limited to, Lotus® Sametime®. (Lotus and Sametime are registered trademarks of International Business Machine Corporation in the United States, other countries, or both). In some embodiments, communication application 54 may include a communication gateway and/or provide functionality of a communication gateway and/or a multipoint control unit (MCU).

In an embodiment, the instruction sets and subroutines of electronic communication application 54 may be stored, e.g., on storage device 16 associated with server computer 12, which executes electronic communication application 54, and/or another suitable storage device. Further, users (e.g., one or more of users 36, 38, 40, 42) may access electronic communication application 54 in order to participate in an electronic communication session (such as a voice call, a video call, an electronic meeting, or other communication session type). The users may access electronic communication application 54 via one or more suitable applications, such as client side applications 10c1-10c4 (e.g., which may include a voice-over-IP application, a video-over-IP application, a web browser, a client electronic meeting application, or another application) and/or via a different application (not shown). Additionally, while some users are depicted as being connected with server computer 12 (and therefore with electronic communication application 54) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of quality of experience process 10 may be provided by one or more of client side applications 10c1-10c4. For example, in some embodiments quality of experience process 10 (and/or client-side functionality of quality of experience process 10) may be included within and/or interactive with client-side applications 10c1-10c4, which may include client side electronic communication applications, web browsers, or another application. Various additional/alternative configurations may be equally utilized.

As generally discussed above with reference to FIG. 2, quality of experience process 10 may determine 100 a language spoken on a communication session. Quality of experience process may also select 102 a codec for the communication session based upon, at least in part, the language spoken on the communication session. Quality of experience process may further transact 104 the communication session using the selected codec for the communication session. According to some embodiments, the quality of experience process may allow take into account the spoken language of the communication session when choosing the codec to be used for the session, and may switch between codecs based upon, at least in part, the spoken language of the communication session. In some embodiments, e.g., in an implementation in which the quality of experience process may operate within a centralized distribution architecture, more than one communication sessions may be conducted, in which the different communication sessions may utilized different codecs based upon, at least in part, the respective languages spoken in each communication session.

Figure 3:
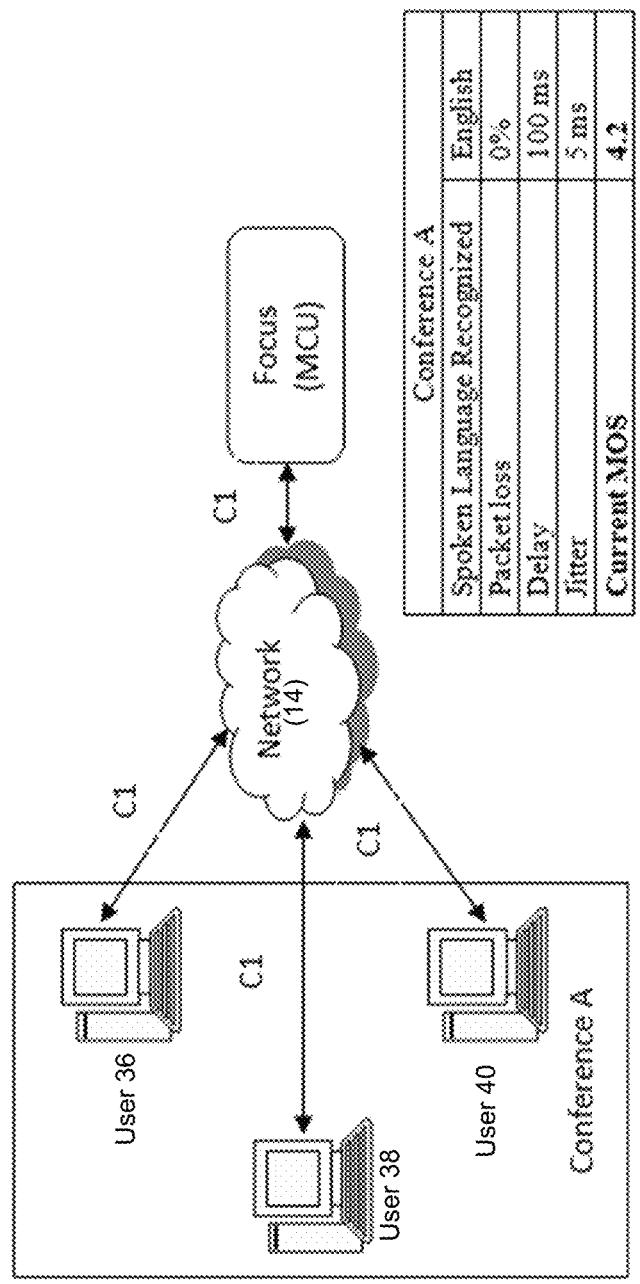
FIG. 3 diagrammatically depicts an implementation of the quality of experience process of FIG. 1, according to an example embodiment.

For example, and referring also to FIG. 3, users (e.g., user 36, user 38, and user 40) of an electronic communication system, such as a VoIP system, or another electronic communication system as generally discussed above, may participate in a communication session (e.g., "Conference A") via respective client electronic devices 28, 30 and 32. As shown in the example embodiment, the communication session may be facilitated via a centralized distribution architecture. As such, client electronic devices 28, 30, 32, via which user 36, user 38, and user 40 may participate in the communication session, may be coupled to network 14 (e.g., which may include the internet or other data network), which may, in turn, be coupled to a focus for the communication session (such as an MCU). As discussed above, the focus/MCU may include functionality of an electronic communication application (such as electronic communication application 54) and may reside on and/or by hosted by server computer 12, and/or another suitable computing device. In general, the focus may receive a communication stream (e.g., a media stream such as an audio stream, an audio/video stream, etc.) transmitted from each of the participants of the communication session (e.g., transmitted from a computing device utilized by each participant of the communication session for the purpose of engaging in the communication session). The focus may decode the communication streams received from each of the participants and may mix the decoded streams to provide a combined, or mixed, communication stream, which may subsequently be re-encoded and distributed (e.g., transmitted) to each of the participants of the communication session. As such, each of the participants of the communication session may receive the mixed media stream for the communication session. It will be appreciated that the focus may perform additional and/or alternative functionality to facilitate the communication session.

While the illustrated examples depict the use of a centralized distribution architecture, in which the focus for the communication session is provided via a computing device other than one or the computing devices associated with a participant of the communication session, other implementations may be utilized. For example, one or more of the participants of the communication session may act as the focus for the communication session. In such an implementation, the participant acting as the focus (i.e., the computing device associated with the participant acting as the focus) may receive the communication streams from each of the participants, decode and mix the communication streams, and re-encode and distribute the mixed communication stream to each of the participants of the communication session. In still further implementations, a distributed architecture may be implemented, e.g., in which each participant (i.e., the computing device associated with each participant) may transmit a communication stream to each other participant (i.e., the computing device associated with each other participant) of the communication session. As such, each participant may receive a communication stream from each other participant of the communication session. The received communication streams from each of the participants of the communication session may be mixed and consumed locally (e.g., by the computing device associated with each respective participant in the communication session).

Each of the participants of the communication session may be capable of utilizing a plurality of different codecs for encoding and transmitting the communication streams. For the purposes of explanation and illustration, each of client electronic device 28, 30, and 32 may be capable of utilized either of codec C1 and codec C2. It will be appreciated that a greater or fewer number of codecs may be available for conducting the communication session between user 36, user 38, and user 40. Examples of codecs that may be utilized in connection with a VoIP communication session may include, but are not limited to, G711, G722, ILBC, SILK, SPEEX, one or more of which may be capable of operating one or more bit rates, and/or may include various different versions. Various additional and/or alternative codecs may be utilized.

With continued reference to FIG. 3, when the communication session is initially started between user 36, user 38, and user 40 one of the available codecs may be selected for conducting the communication session. In the illustrated example, codec C1 may be initially selected for beginning the communication session. The initially selected codec may be selected based upon, for example, a default setting, and/or various other factors.

Figure 4:
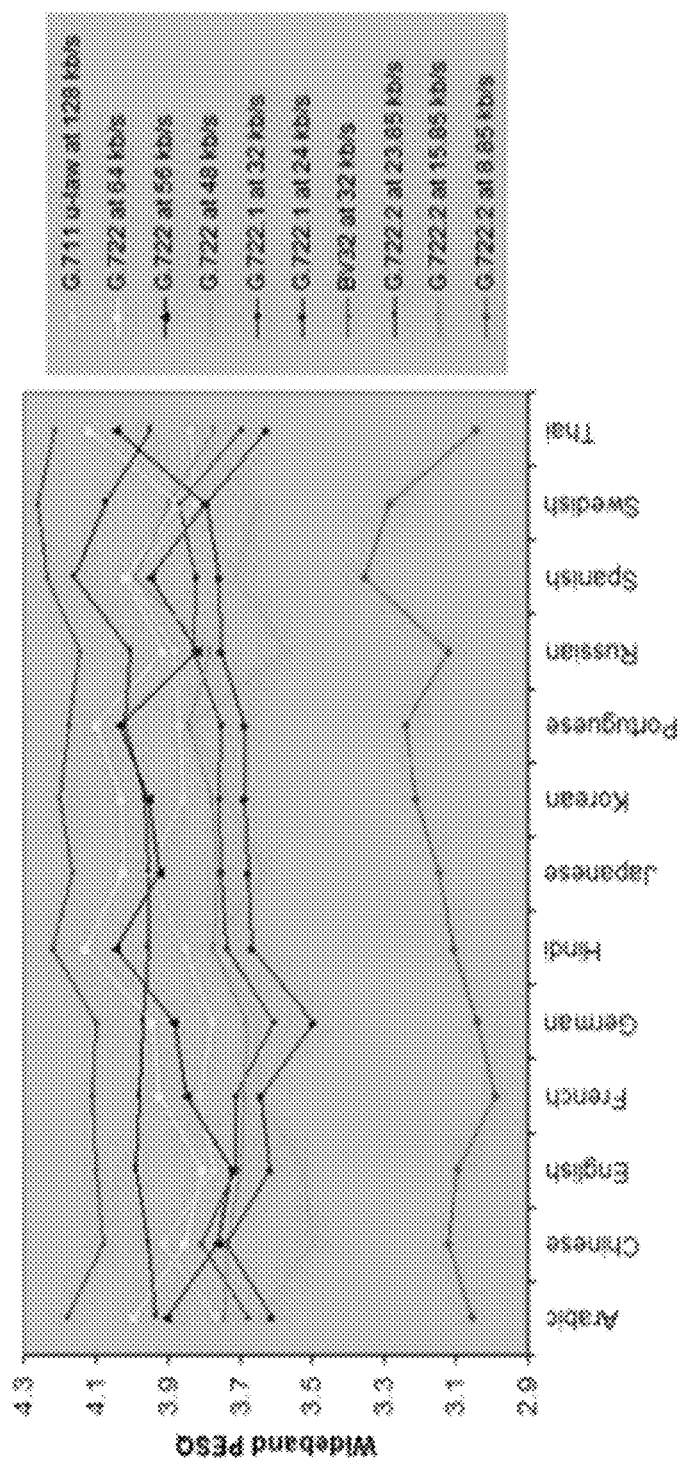
FIG. 4 diagrammatically depicts an implementation of the quality of experience process of FIG. 1, according to an example embodiment.

Consistent with an aspect of the present disclosure, it has been determined that the performance (e.g., subjectively perceived quality of experience) of different codecs may vary based upon, at least in part, the spoken language that is being encoded/decoded by the codec. As such, the present disclosure may provide for the adaptive selecting and/or switching of codecs to provide a relatively higher quality of experience based upon, at least in part, the language being spoken on a communication session. For example, and referring also to FIG. 4, the performance of various different sets of codecs are shown relative to 13 different languages. The performance of the codecs relative to the language being spoken have been rated based upon a wideband PESQ mean opinion score (MOS), which may provide a general rating of the quality of experience. As an example of the difference in performance provided by different codecs for a given language, as shown if the spoken language is English, the G722.2 codec at 23.85 Kbps may outperform the G722 codec at 64 Kbps by an MOS of about 0.3. Conversely, if the spoken language is Hindi, the opposite may occur, with the G722 codec at 64 Kbps may outperform the G722.2 codec at 23.85 Kbps. As shown in FIG. 4, the performance of various other codecs may similarly vary based upon, at least in part, the spoken language being encoded/decoded by the codec.

Continuing with the foregoing, quality of experience process 10 may determine 100 a language spoken on a communication session. In some implementations, the gender (e.g., which may relate to a relative pitch of the speakers voice) may also impact the performance of various codecs. As such, in some embodiments, determining 100 the language spoken on the communication session may also include determining the gender (e.g., based upon a relative pitch) of one or more of the participants in the communication session. In an implementation, as shown in FIG. 3, quality of experience process 10 may determine 100 the language spoken on the communication session as part of the set-up of the communication session.

Determining 100 the language spoken on the communication session may include processing 106 at least a portion of a conversion using voice recognition. For example, when a participant of the communication speaks, the spoken audio signal may be sampled. The sampled audio signal may be analyzed using voice recognition software to determine the language being spoken. Processing 106 a portion of a conversion (e.g., a sample of an audio signal) of the communication session may occur locally or remotely. For example, when a participant (e.g., user 36) speaks, the spoken audio signal may be sampled by computing device 28, utilized by user 36, and the audio signal may be processed 106 using voice recognition via computing device 28. In another example, when user 36 speaks, the spoken audio may be transmitted (e.g., including being encoded by an initially selected codec) to a focus (such as communication application 54) provided at a remote computing device relative to user 36. The transmitted communication stream including the spoken audio from user 36 may be processed 106 remotely (e.g., by the remote focus and/or a voice recognition application or module receiving the communication stream from the focus). Based upon, at least in part, the processing of the portion of the spoken conversation using voice recognition, quality of experience process 10 may determine 100 the language spoken on the communication session.

Determining 100 the language spoken on the communication session may include identifying 108 one or more participant characteristic. For example, in addition, or as an alternative to, processing 106 a portion of a conversation using voice recognition, one or more participant characteristics may be identified 108 to determine 100 the language spoken on the communication session. In an embodiment, the one or more participant characteristics may include a user input relative to the language spoke on the communication session. For example, one or more of the participants of the communication session may provide an explicit indication of the language to be/being spoken on the communication session. For example, one or more participants may select a language spoken on the communication session, e.g., from a dropdown list or other suitable selection mechanism. In another example, a participant characteristic may include a default language setting associated with one or more applications executed on the computing device associated with the participant. For example, one or more applications (such as the communication application utilized for participating the communication session, a word processing application, and email application, or the like) executed on computing device 28 utilized by user 36 may be configured to display menus, dialog content, etc., in English. Accordingly, quality of experience process 10 may identify 108 the default language setting of such applications as being a participant characteristic that may be indicative of a language spoken on the communication session. According to another example, quality of experience process 10 may identify a geographic location of one or more participants as being indicative of the language spoken on the communication session. For example, if one, or all, of the participants are located in Paris, France, quality of experience process 10 may determine 100 that French is the language spoken on the communication session.

It will be appreciated that more than one participant characteristic, and/or characteristics of more than one participant may be identified 108 for the purpose of determining the language spoken on the communication session. For example, if user 36 is located in Paris, France, but all application default languages are set to English, and the other participants are located in English speaking countries, quality of experience process 10 may determine 100 that the language spoken on the communication session is English. It will be appreciated the processing 106 a portion of the conversation may be implemented together with identifying 108 one or more participant characteristics to determine 100 the language spoken on the communication session.

Determining 100 the language spoken on the communication session may include determining 110 a plurality of languages spoken on the communication session and associating 112 a weighting factor with each of the plurality of languages. For example, based upon, at least in part, processing 106 conversation from the communication session and/or identifying 108 one or more participant characteristics, quality of experience process 10 may determine 100 that more than one language is being, and/or may possibly be, spoken on the communication session. As an example, user 36 and user 38 may converse in French (e.g., based upon processing conversation portions) and user 36, user 38 and user 40 may all converse in English (e.g., based upon processing conversation portions). As such, quality of experience process 10 may determine 110 that English and French are spoken on the communication session. In a similar manner, and referring to the previous example in which user 36 may be located in France, while user 38 and user 40 may be located in English speaking countries, quality of experience process 10 may determine 110 that English and French may possibly be spoken on the communication session.

Quality of experience process 10 may associated 112 a weighting factor with each of the determined 110 plurality of language. In an embodiment, the weighting factor may, for example, be indicative of the relatively amount of the communication session taking place in each of the languages. For example, if 40% of the conversation (e.g., based upon spoken content, time duration, etc.) is occurring in French and the remainder is occurring in English, a weighting factor of 4 may be associated 112 with French and a weighting factor of 6 may be associated with English. In an embodiment, the weighting factor may, for example, be indicative of the relative number of participants speaking in each language. For example, in the above-example in which user 36 and user 38 may speak French to one another, and user 36, user 38, and user 40 may speak English to one another, a weighting factor of 2 may be associated 112 with French, and a weighting factor of 3 may be associated 112 with English. In an embodiment, the weighting factor may, for example, be indicative of a likelihood of each language being spoken. For example, in the above-example in which user 36 may be located in France, and user 38 and user 40 may be located in English speaking countries, a weighting factor of 1 may be associated 112 with French and a weighting factor of 2 may be associated with English. Further, continuing with the above-example in which user 36 may be located in France, but may utilize English as a default language for one or more applications utilized by user 36, a weighting factor of 1 may be associated 112 with French, and a weighting factor of 3 may be associated with English (for example, based upon the number of indicators of the likelihood of each language being spoken). Other mechanisms may be implemented for associating 112 weighting factors with each of the determined 110 plurality of languages.

Quality of experience process 10 may select 102 a codec for the communication session based upon, at least in part, the language spoken on the communication session. For example, and as shown with respect to FIG. 4, different codecs may provide different levels of performance when used in connection with different languages. In an embodiment, the performance level (e.g., in terms of subjective or objective MOS or other performance scoring mechanism) of various different codecs may be experimentally determined when used in connection with different languages. In an embodiment, selecting 102 a codec for the communication session based upon, at least in part, the language spoken on the communication session may included selecting 102 a codec that is available to each of the participants of the communication session (e.g., as different participants may have different sets of codecs available for conducting the communication session), and that may provide a satisfactory quality of experience for the language spoken on the communication session. In an embodiment, a satisfactory quality of experience may include a quality of experience above a defined threshold. In some such embodiments, more than one codec may provide a satisfactory quality of experience, and therefore any such codec may be selected 102. In an embodiment, a satisfactory quality of experience may be provided by the codec that is common to all of the participants and that will provide the highest quality of experience for the determined 100 language spoken on the communication session.

In an embodiment in which a plurality of languages may be spoken on the communication session, a codec may be selected based upon, at least in part, the weighting factor associated 112 with each of the languages. For example, a codec may be selected that may provide a satisfactory quality of experience for the most highly weighted language (e.g., the most likely language to be spoken on the communication session, or the language likely to be spoken the most often or by the most participants). In some embodiments, in addition to selecting a codec that may provide a satisfactory quality of experience for the most highly weighted language, a codec may be selected that may consider the performance associated with other languages spoken on the communication session. For example, of the codecs that perform well in the primary language of the communication session (e.g., the most highly weighted language), quality of experience process may select 102 the codec that may perform comparatively highest in secondary language (e.g., the next mostly highly weighted language), etc. The degree of consideration given to the secondary language may, in some embodiments, be based upon the relative weighting factors associated with the primary and secondary languages. For example, for a communication session in which English has a weighting factor of 10 and French has a weighting factor of 2, relatively less consideration may be given to the performance of the codec for French than if English has a weighting factor of 10 and French has a weighting factor of 8. Various additional/alternative implementations may be equally utilized.

In some situations, the quality of experience associated with a communication session may be greatly effected by network conditions associated with the communication session (e.g., the network conditions over which traffic for the communication session may be transmitted). For example, delay, packet loss, jitter, burst ratio may be important factors that may impact the perceived quality of experience of the individuals participating in a communication session. For example, as packet loss increases the quality of the communication may be degraded, for example with the individuals experiencing broken or garbled audio signals, increased interference and noise, and the like. Changes in other network characteristics may similarly impact, either positively or negatively, the quality of experience perceived by the participants in a communication session.

Consistent with an embodiment, quality of experience process 10 may take into consideration the network conditions associated with the communication session in selecting 102 the codec for use with the communication session. Accordingly, in some embodiments, quality of experience process 10 may determine 114 one or more network characteristics associated with the communication session. For example, quality of experience process 10 may determine 114 network conditions between each participant and the focus (e.g., in a centralized distribution architecture). Similarly, in an embodiment in which one of the participants may act as the focus for the communication session, or in which a distributed architecture may be utilized, quality of experience process 10 may determine 114 network conditions between each participants. For example, quality of experience process 10 may determine one or more of delay, packet loss, jitter, burst ratio associated with the communication session. It will be appreciated that additional and/or alternative network characteristics may be determined 114. Quality of experience process 10 may analyze network conditions relative to the plurality of codecs available to each of the participants to determine how well communication traffic encoded according to each of the available codecs may be expected to perform (i.e., to determine the perceived end user experience) given the determined network characteristics.

Consistent with the foregoing, in an embodiment, selecting 102 the codec for the communication session may be based upon, at least in part, the one or more network characteristics. That is, quality of experience process 10 may select a codec providing a satisfactory quality of experience for the determined 100 language on the communication session and for the determined 114 network conditions associated with the communication session. For example, in the illustrated example of FIG. 3, English may be determined 100 to be the language spoken on the communication session, and the network associated with the communication session may be determined 114 to be experiencing 0% packet loss, a delay of 100 ms, and a jitter of 5 ms. Based upon, at least in part, the language spoken on the communication session and the network conditions associated with the communication session, quality of experience process 10 may select codec C1, which may provide a quality of experience represented by an MOS of 4.2.

Quality of experience process 10 may transact 104 the communication session using the selected codec for the communication session. Transacting 104 the communication session may include transmitting an indication of a selected codec to be utilized for transmitted communication traffic to each participant of the communication session. For example, and as described above, codec C1 may be selected 102 for the communication session. As such, quality of experience process 10 may transmit an indication that codec C1 should be used for transmitted communication traffic to each of the participants of the communication session (e.g., to the computing device utilized by each participant of the communication session). Accordingly, communication streams transmitted by each participant (e.g., to the focus and ultimately to the other participants as part of a mixed stream) may be encoded according to the selected codec. Similarly, the mixed stream may be encoded by the focus using the selected codec. Distributed architecture arrangements may operate in a similar manner, e.g., which communication streams transmitted to each of the other participants being encoded using the selected codec.

As generally discussed above, a codec for conducting the communications session may be established when the communication session first begins. In this regard, selecting 102 the codec for the communication session may include selecting the codec for the communication during set-up of the communication session. Selecting 102 the codec for the communication session during set-up of the communication session may be based upon, at least in part, an initially determined 100 language on the communication session (e.g., via sampling initial portions of conversation, identifying participant characteristics, or the like), and/or based upon one or more preferences and/or default settings.

In some situations, conditions, parameters, and aspects associated with the communication session may change during the course of the communication session. According to an embodiment, quality of experience process 10 may adaptively switch or change the codec utilized for the communication session during the course of the communication session to account for such changes and to provide a relatively high quality of experience associated with the communication session. For example, quality of experience process 10 may continuously and/or intermittently determine 100 the language spoken on the communication session and/or determine 114 one or more network conditions associated with the communication session.

Selecting 102 the codec for the communication session may be in response to determining 116 a change in the language spoken on the communication session. For example, a communication session may initially be conducted in a first language, and may subsequently change to a second language. An example of such a situation may include the communication session of Conference A, which may initially be conducted in English between user 36, user 38, and user 40. At some point in time during the communication session user 40, who may only speak English, may leave the communication session. At such a point, user 36 and user 38, who may both speak French, may continue the communication session in French. Upon user 36 and user 38 continuing the communication session in French, quality of experience process 10 may determine 116 a change in the language spoken on the communication session. The language spoken on the communication session may change for various other reasons, and in any such situation quality of experience process 10 may determine 116 the change in the language spoken on the communication session. Quality of experience process 10 may determine 116 the change in the language spoken on the communication session, e.g., by processing at least a portion of the conversation using voice recognition, based upon, at least in part, one or more participant attributes, and/or via any other suitable mechanism, as discussed above. In response, at least in part, to determining 116 a change in the language spoken on the communication session, quality of experience process 10 may select a changed codec for the communication session, e.g., in which the changed codec may provide a satisfactory quality of experience for the changed language. Quality of experience process 10 may thereafter transact 104 the communication session using the changed codec. As such, quality of experience process may adaptively and/or dynamically switch from one codec to another codec based upon, at least in part, the language spoken to provide a satisfactory quality of experience.

Selecting 102 the codec for the communication session may be in response to determining 118 a change in one or more network characteristics associated with the communication session. For example, over the course of the communication session one or more characteristics associated with the network may change, e.g., due to changes in network congestion and/or other changes that may impact the performance characteristics of the network. The changes in the network characteristics may, accordingly, impact the relative performance of the available codecs. As such, the selected codec may not provide an acceptable perceived quality of experience and/or may not provide an optimum perceived quality of experience for the communication session.

For example, and referring also to FIG. 5, during the course of the communication session, the packet loss associated with the network may increase to 2%, e.g., which may cause the performance of the selected codec to deteriorate (for the language spoken on the communication session) such that the perceived quality of experience for the participants may be diminished (e.g., resulting in a perceived quality of experience represented by an MOS of 3.6). Additionally/alternatively, the changes in network conditions may make it such that a different codec may be capable of providing a communication session having a higher perceived quality of experience for the language spoken on the communication session. According to an embodiment, quality of experience process 10 may adaptively vary the codec utilized for transacting the communication session, e.g., to provide an acceptable perceived quality of experience and/or to provide the highest possible perceived quality of experience.

Figure 6:
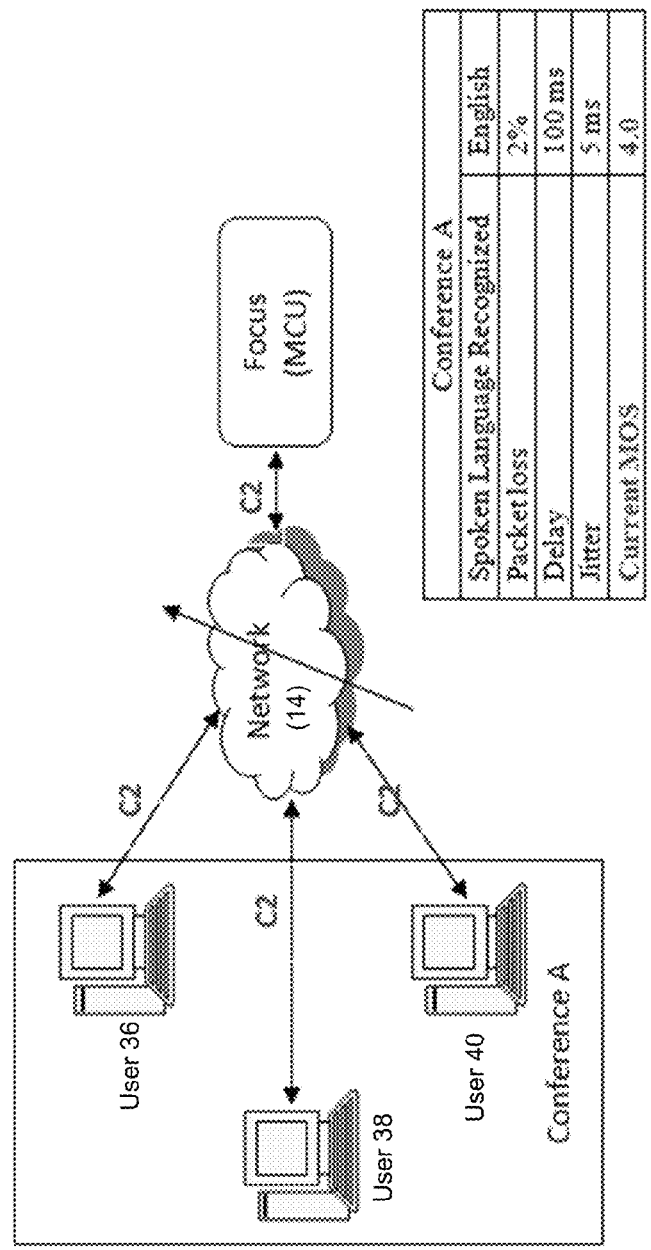
FIG. 6 diagrammatically depicts an implementation of the quality of experience process of FIG. 1, according to an example embodiment.

As such, quality of experience process 10 may vary the codec utilized to transact 104 the communication session throughout the duration of the communication session. For example, and referring also to FIG. 6, in response to determining 118 the change in the packet loss associated with the network, quality of experience process 10 may select 120 codec C2 (e.g., as a changed codec) for transacting 122 the communication session. In the example situation, codec C2 may provide a satisfactory quality of experience for a communication session including English as the spoken language, and having the determined 118 changed network conditions. The adaptive switching of the codec may occur continuously and or intermittently (e.g., at regular intervals and/or in response to changes in network conditions, or based upon one or more other factors).

Figure 7:
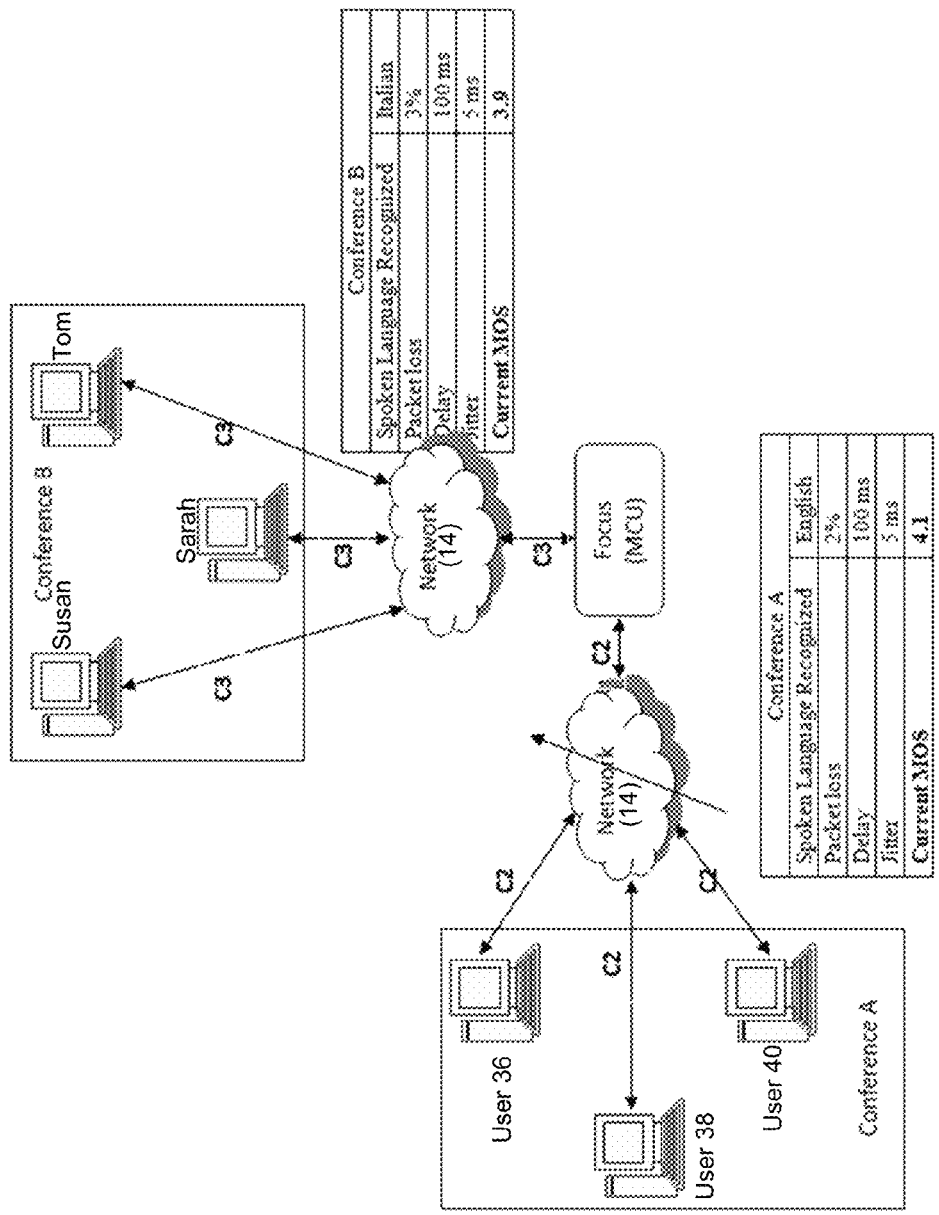
FIG. 7 diagrammatically depicts an implementation of the quality of experience process of FIG. 1, according to an example embodiment.

Referring also to FIG. 7, in an implementation quality of experience process may be capable of facilitating multiple simultaneous communication session, e.g., using the same focus. For example, while Conference A is ongoing a second communication session (e.g., "Conference B") may be initiated having Susan, Sarah, and Tom as participants. Quality of experience process 10 may determine 100 that Italian is being spoken in Conference B, and may further determine 114 that the network associated with Conference B is experiencing 3% packet loss, a delay of 100 ms, and a jitter of 5 ms. Based upon, at least in part, the determined 100 language of Conference B, and the determined 114 network conditions associated with Conference B, quality of experience process 10 may select codec C3 as being the codec available to each of the participants which may provide a satisfactory quality of experience for Conference B. As such, quality of experience process 10 may transact 104 Conference B using codec C3 to provide a quality of experience represented by an MOS of 3.9. Consistent with the illustrated embodiment, the focus (e.g., which may be provided by communication application 54) may simultaneously support (e.g., in the role of focus), both Conference A (conducted in English and utilizing codec C2) and Conference B (conducted in Italian and utilizing codec C3).

Figure 9:
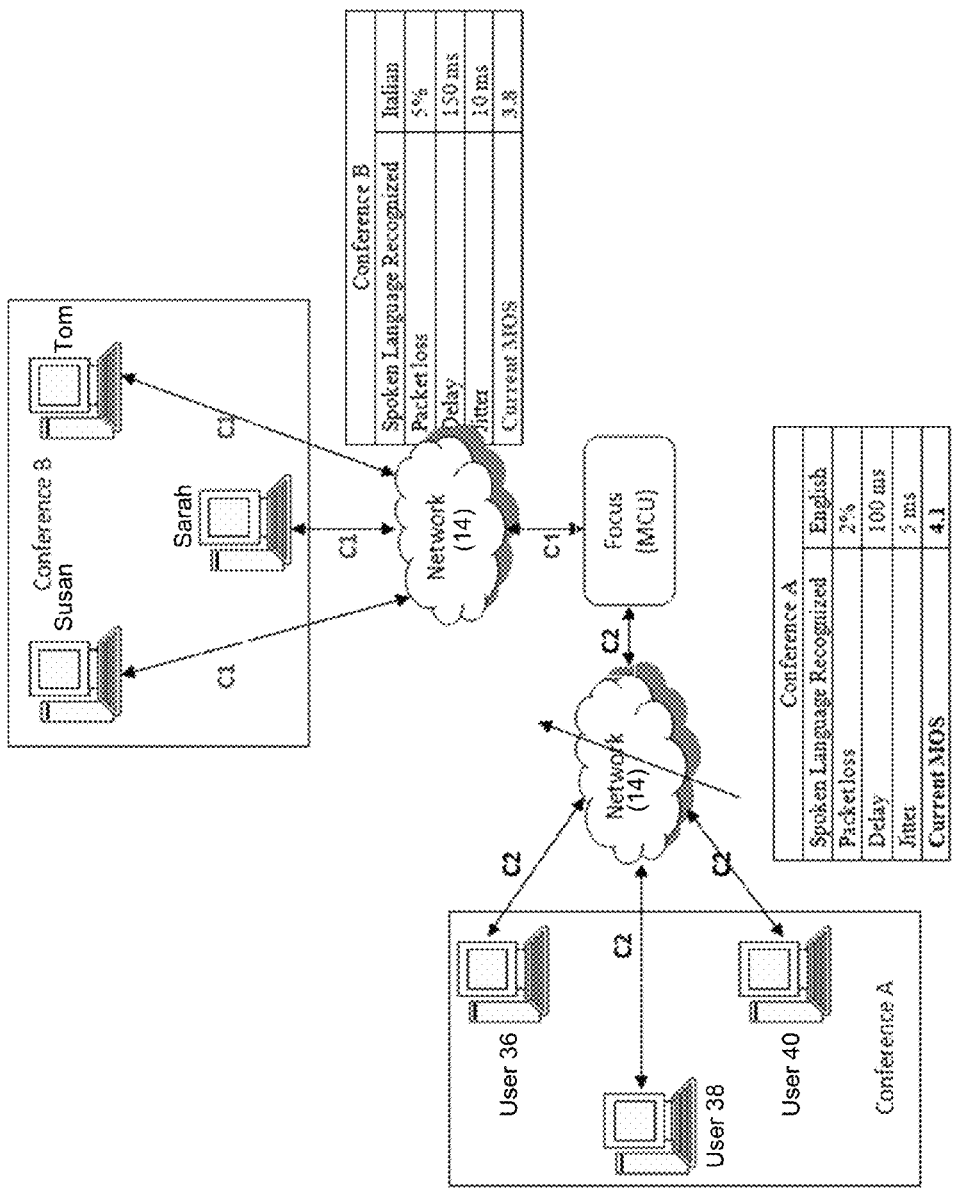
FIG. 9 diagrammatically depicts an implementation of the quality of experience process of FIG. 1, according to an example embodiment.

Referring to FIG. 8, at some point during the course of Conference B, the network conditions associated with Conference B may change, resulting in a deterioration in the quality of experience associated with Conference B. For example, as shown, the network conditions associated with Conference B may deteriorate resulting in a packet loss of 5%, a delay of 150 ms, and a jitter of 10 ms. As a result of the change in the network conditions, the quality of experience associated with Conference B may drop to an MOS of 3.2. In a similar manner as described above, quality of experience process 10 may determine 118 the changed network conditions shown in FIG. 8. With reference also to FIG. 9, at least in part in response to determining 118 the changed network conditions, quality of experience process 10 may select 120 a changed codec (e.g., codec C1) for conducting Conference B. As shown, transacting 122 Conference B using the selected 120 changed coded C1, quality of experience process 10 may provide a quality of experience associated with Conference B having an MOS of 3.8

Consistent with some embodiments, quality of experience process 10 may continue running in real time and may continuously and/or intermittently determine the language spoken on a communication session and/or the network conditions associated with a communication session. As such, quality of experience process 10 may adaptively switch between codecs based upon, at least in part, the spoken language and the network conditions, to provide a satisfactory quality of experience for the communication session. Additionally, in some implementations, a single focus may be capable of supporting communication sessions having multiple spoken language on the same communication session, while maintaining a satisfactory quality of experience (e.g., which may include a quality of experience above a threshold and/or a highest achievable quality of experience given the conditions). Further, in some implementations, a single focus may support multiple different communication sessions at the same time (and/or at least partially overlapping in time), in which the different communication sessions may include different spoken languages and/or different associated network conditions. In such an implementation, the multiple different communication sessions may utilize different codecs, e.g., which may respectively provide a satisfactory quality of experience for each communication session.

Figure 10:
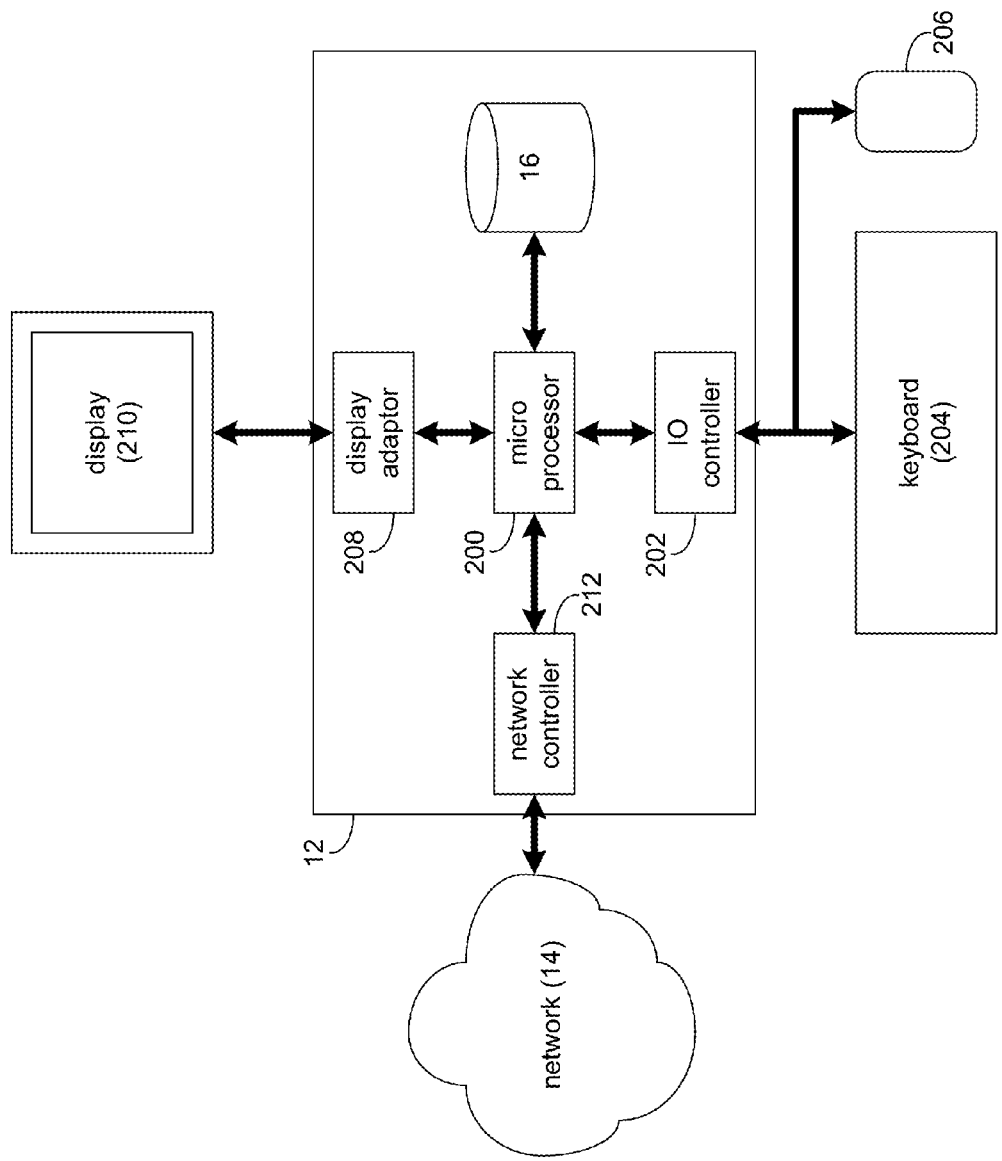
FIG. 10 is a diagrammatic view of the computing device of FIG. 1, according to an implementation of the present disclosure.

Referring also to FIG. 10, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of experience process 10 may be substituted for computing device 12 within FIG. 10, examples of which may include but are not limited to client electronic devices 28, 30, 32, 34.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   determining a language spoken on a communication session;
   selecting a first codec for the communication session based upon, at least in part, the language spoken on the communication session;
   selecting a second codec for the communication session in response to determining a change in the language spoken on the communication session; and
   transacting the communication session using the second codec for the communication session.

2. The computer-implemented method of claim 1, wherein determining the language spoken on the communication session includes processing at least a portion of a conversion using voice recognition.

3. The computer-implemented method of claim 1, wherein determining the language spoken on the communication session includes identifying one or more participant characteristic.

4. The computer-implemented method of claim 1, wherein determining the language spoken on the communication session includes determining a plurality of languages spoken on the communication session and associating a weighting factor with each of the plurality of languages.

5. The computer-implemented method of claim 1, further comprising:
   determining one or more network characteristics associated with the communication session; and
   wherein selecting the first codec for the communication session is further based upon, at least in part, the one or more network characteristics.

6. The computer-implemented method of claim 1, wherein selecting the first codec for the communication session includes selecting the first codec for the communication during set-up of the communication session.

7. The computer-implemented method of claim 1, wherein selecting the codec for the communication session is in response to determining a change in one or more network characteristics associated with the communication session.

8. A computer implemented method comprising:
   determining, by a processor, a language spoken on a communication session;
   determining, by the processor, one or more network characteristics associated with the communication session;
   selecting, by the processor, an initial codec for the communication session based upon, at least in part, the language spoken on the communication session and the one or more network characteristics;

transacting, by the processor, the communication session using the selected initial codec for the communication session;
determining, by the processor, a changed network characteristic associated with the communication session;
selecting, by the processor, a changed codec for the communication session in response to a change in the language spoken on the communication session and the changed network characteristic; and
transacting, by the processor, the communication session using the changed codec for the communication session.

* * * * *